United States Patent

Doss-Desouza

[11] Patent Number: 5,761,611
[45] Date of Patent: Jun. 2, 1998

[54] COMPONENT HOLDER FOR A BAG PHONE

[75] Inventor: Argus Doss-Desouza, Sunningdale, England

[73] Assignee: Nokia Mobile Phones Limited, Espoo, Finland

[21] Appl. No.: 302,089

[22] Filed: Sep. 6, 1994

Related U.S. Application Data

[63] Continuation of Ser. No. 58,981, May 6, 1993, abandoned.

[30]    Foreign Application Priority Data

May 9, 1992 [GB] United Kingdom ............... 9210049

[51] Int. Cl.⁶ ................... H04B 1/38; H04B 1/08
[52] U.S. Cl. ............. 455/90; 455/575; 455/351; 379/440; 361/730; 361/814
[58] Field of Search ................ 379/428, 429, 379/430, 431, 434, 437, 440, 441, 58–61, 419, 451, 453; 455/90, 89, 346–9, 351, 550, 571, 572, 575; 361/730, 749, 752, 758, 814; 224/235–7, 250, 906, 914; 206/320, 576; 429/100, 76; 402/3

[56]    References Cited

U.S. PATENT DOCUMENTS

| | | | |
|---|---|---|---|
| 2,423,853 | 7/1947 | Ryan | 224/236 |
| 2,560,320 | 7/1951 | Winkler | 455/90 |
| 4,677,654 | 6/1987 | Lagin et al. | 379/437 X |
| 5,242,056 | 9/1993 | Zia et al. | 206/320 X |

FOREIGN PATENT DOCUMENTS 0348187  12/1989  European Pat. Off. .

OTHER PUBLICATIONS

Exec–U–Desk Advertisement; Mobile Office; vol. 3, No. 11, Nov. 1992, p. 91.

Jeff Hecox, 'Transportable Phones', Mobile Office, vol. 3, No. 11, Nov. 1992, pp. 113, 114, 116.

Motorola 'Handie–Talkie®' Radiophone Jul., 1955.

*Primary Examiner*—Reinhard J. Eisenzopf
*Assistant Examiner*—Philip J. Sobutka
*Attorney, Agent, or Firm*—Perman & Green, LLP

[57]    ABSTRACT

A bag phone comprises a bag (2) holding a cellular radio telephone handset (14), transceiver housing (22) and battery pack (26). To allow access to the battery pack (26) for re-charging, the handset (14), transceiver housing (22) and battery pack (26) are all carried in a holder (28) which can be taken out of and placed in the bag (2) as a unit. The holder (28) is a sheet of lightweight material which is configurable between a folded position in which it can be placed in and removed from the bag, and an unfolded configuration which allows access to the battery for re-charging.

15 Claims, 3 Drawing Sheets

COMPONENT HOLDER FOR A BAG PHONE

This is a continuation of application Ser. No. 08/058,981 filed on May 06, 1993 now abandoned.

BACKGROUND OF THE INVENTION

The invention relates to a radio telephone, in particular a cellular radio telephone, which can be carried around by a user in a bag or case, and which is commonly referred to as a bag phone.

Cellular radio telephones fall into two main categories namely mobiles and hand portables. As the name implies, a hand portable telephone is relatively lightweight and small in size and operates from an, internal, rechargeable battery pack so that it may readily be carried around by the user. A mobile telephone, on the other hand, is permanently installed in a vehicle and operates from the vehicle's own (higher voltage) power. A mobile has the advantage over a hand portable that it can transmit at a higher power level, but a hand portable has the advantage that the user does not need to be in or near a vehicle to use the telephone, since it can be used anywhere within range of a base station. Unlike a mobile telephone, however, a hand portable does have the drawback of having a limited stand-by and call time before the internal battery pack needs to be recharged. However, some users require both the flexibility of the hand portable with regard to location and the ability to operate the telephone over a long period of time. An example of this may be an architect who spends all day on site and needs to keep in regular touch with his office and is regularly receiving calls. In this case, it is not possible for such a person to be near his car and a hand portable telephone may not last the whole day as the battery will run down.

An intermediate category of cellular radio telephone is therefore manufactured with these requirements in mind. These are known as transportables. Transportables are much larger than hand portable telephones and comprise a rigid box containing the radio transceiver and a battery pack providing more power than a portable telephone, with the handset usually carried on a cradle providing as an integral part of the box. The whole unit is carried by means of a handle fixed to the box. These transportables tend to be relatively cumbersome and quite heavy because of the size of the transceiver and battery pack (which needs to be large because of the power requirements) and are therefore not particularly adapted for being carried long distance. In addition, the handset is exposed on the top of the box and is liable to be dislodged during transportation.

One solution to this problem is to provide what are known as bag phones. Here, rather than placing the transceiver and battery pack in a rigid box and having the handset and cradle carried on the box, the transceiver housing, battery pack, handset and cradle, are placed in a bag, for example a canvas bag, and provided with a shoulder strap for carrying the telephone, as a unit, on the user's shoulder. Thus, the telephone is more easily carried, it is lighter and the handset is not exposed during transportation, but is nevertheless accessible, via, for example, a zippered opening, for making a call.

In order to avoid relative movement between the battery pack, transceiver housing, handset and cradle in the bag, it is known to mount them within a rigid frame-like holder which is placed in the interior of the bag. The holder is typically box-like and made of rigid, molded plastics material with compartments for locating the transceiver housing, battery pack etc. However, this holder is relatively expensive to make, adds to the weight of the whole unit and makes the whole assembly rather unwieldy to take in and out of the bag when the battery pack needs to be removed for recharging. Additionally, it may be necessary to remove the transceiver holder, for example, in order to gain access to the battery pack for recharging.

SUMMARY OF THE INVENTION

According to the present invention, there is provided a radio telephone assembly comprising a housing enclosing transceiver circuitry, a battery pack for supplying power to the transceiver circuitry, and a holder for the transceiver housing and battery pack wherein the holder is configurable between a folded configuration and an unfolded configuration such that in the folded configuration, there is defined a cavity to enclose the battery pack.

DESCRIPTION OF A PREFERRED EMBODIMENT

The invention will now be described, by way of example only, with reference to the accompanying drawings.

A bag phone in accordance with the invention comprises a bag 2, which may be made from canvas or some other strong, flexible material for example a plastics material or leather. Alternatively the bag 2 can be in the form of a solid case made from for example, rigid plastics material as is typically used for the manufacture of briefcases and suitcases. The bag 2 is provided with a handle or shoulder strap (not shown) for carrying the bag 2 over the shoulder and attached to the bag 2 by means of a clip 4.

The bag 2 is provided with a hinged flap 6, which when opened, allows easy access to the interior 8 of the bag 2.

Figure 1:
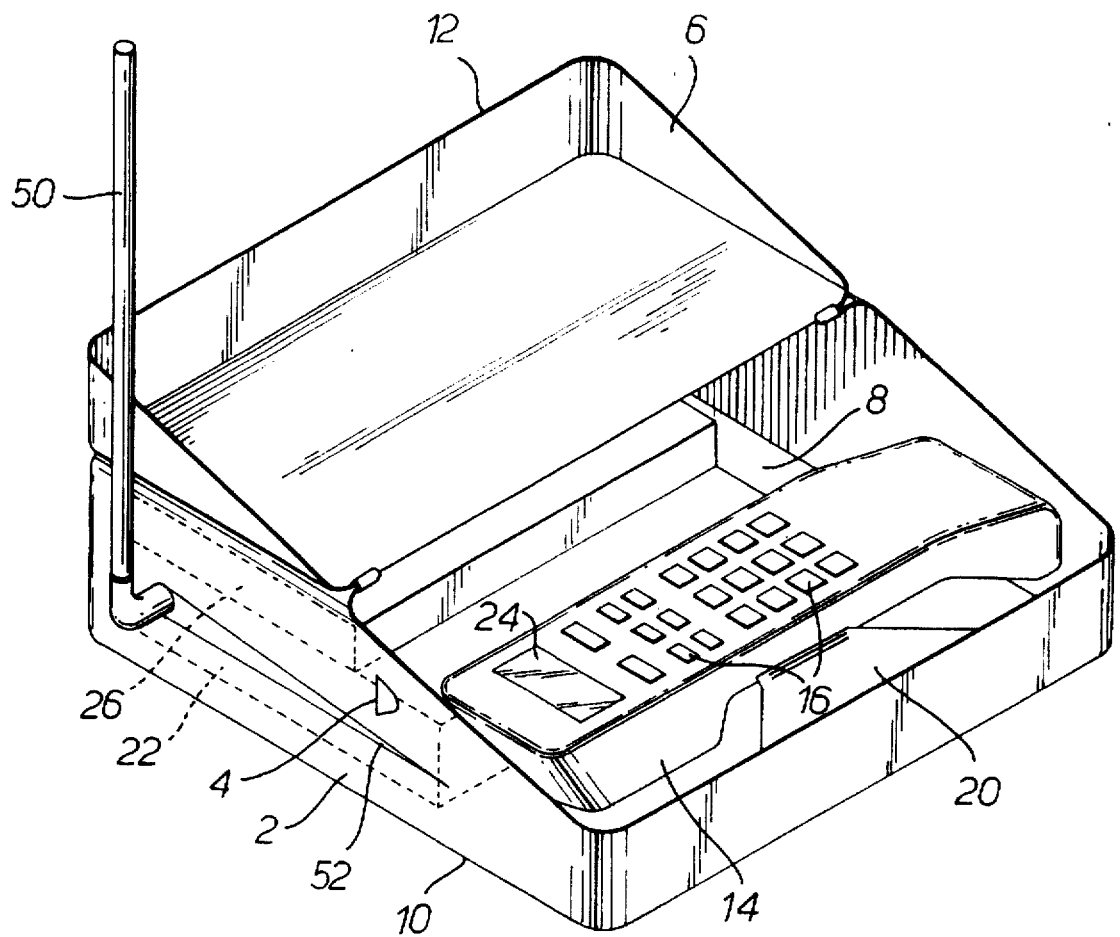
FIG. 1 is a perspective view of a bag phone in accordance with the invention showing the interior of the bag.

The bag 2, is typically of a box-like configuration and is advantageously carried by the shoulder strap so that the flap 6 is facing away from the body of the user allowing the user to open the flap 6 while still carrying the bag phone. FIG. 1 shows the bag phone as placed on a flat horizontal surface. The underneath surface 10 of the bag 2, would, typically, be against the body of the user when being carried.

The flap 6 is closed using a zip 12. However, other fastening means, e.g. press studs could be used. Mounted in the interior 8 of the bag 2 are the operating parts of the bag phone 1, namely a handset 14 comprising keys 16 for operation of the telephone, a display 24, a mouthpiece and an earpiece (not shown), a cradle 20 for mounting the handset 14 thereon, a transceiver housing 22 enclosing transceiver circuitry connected to the handset 14 by means of a helical cord (not shown), and a battery pack 26 for supplying power to the transceiver circuitry. The handset 14, cradle 20, transceiver housing 22 and battery pack 26 are standard devices used in cellular radio telephony and are well known to persons skilled in the art and their operation will not be described here as they are not relevant to the instant invention.

As mentioned above, it is necessary to have access to the handset 14 for making calls, and to the battery pack 26 for re-charging.

The handset 14, cradle 20, transceiver housing 22 and battery pack 26 are therefore carried in a holder 28 which allows them to be removed from and placed in the bag 2 as a unit.

Figure 4:
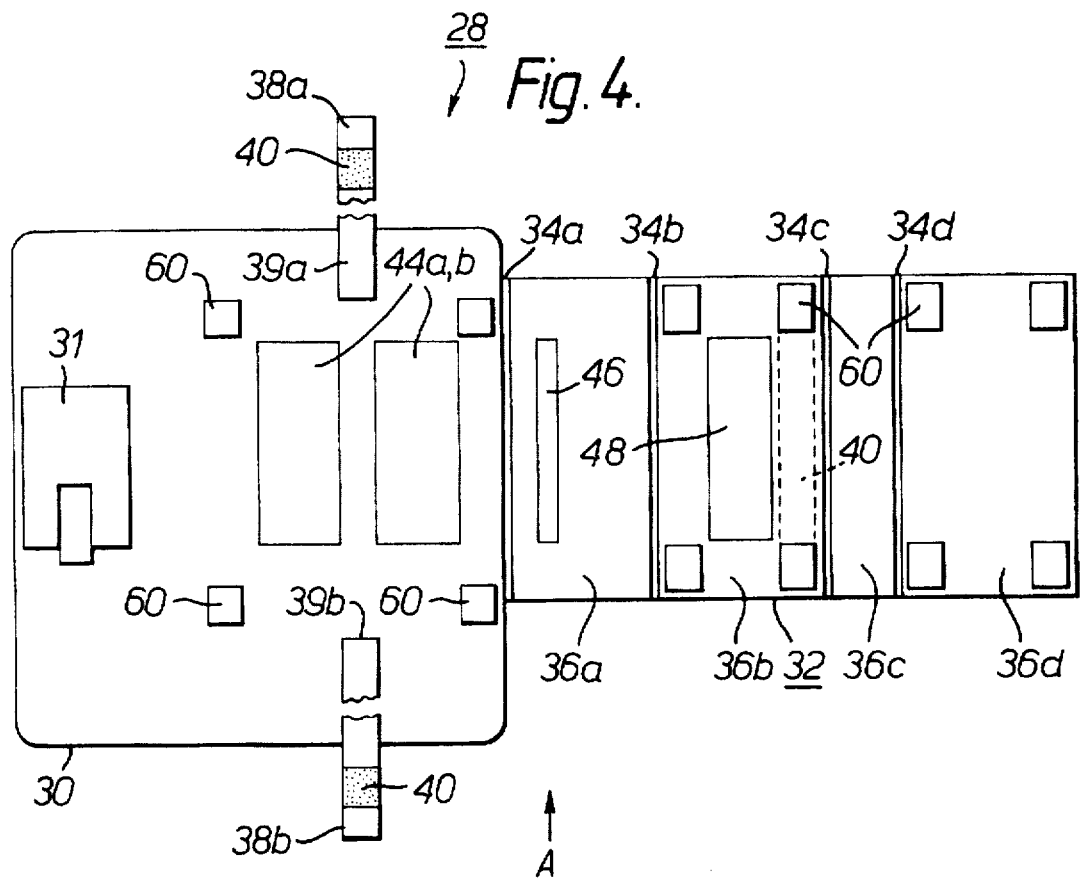
FIG. 4 is a plan view of the holder in its unfolded configuration without the cradle handset, transceiver housing and battery pack in place.
Figure 5:
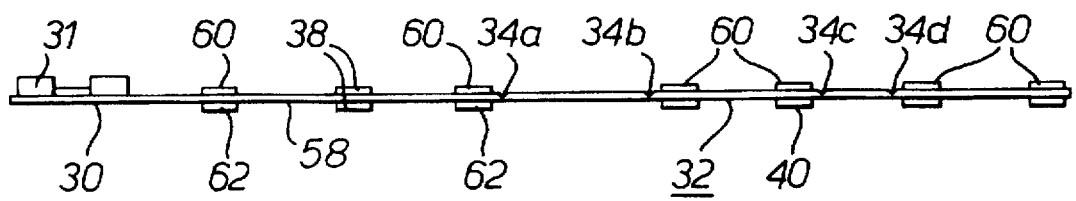
FIG. 5 is an end view in the direction of arrow A of FIG. 4.

The holder 28 is shown, in plan form, in its unfolded configuration, without anything mounted thereon, in FIG. 4.

The holder 28 is constructed from a thin essentially T-shaped sheet material and comprises a substantially square or rectangular base portion 30, of a size that can be received in the interior 8 of the bag 2 flat against the underneath surface 10 without much movement within the interior 8, and a rectangular shaped portion 32 extending from one side of the base portion 30. Lines of weakness 34 are provided in the rectangular portion 32 such that, at these lines of weakness 34a–34d, the material can be folded through 90°.

Figure 2:
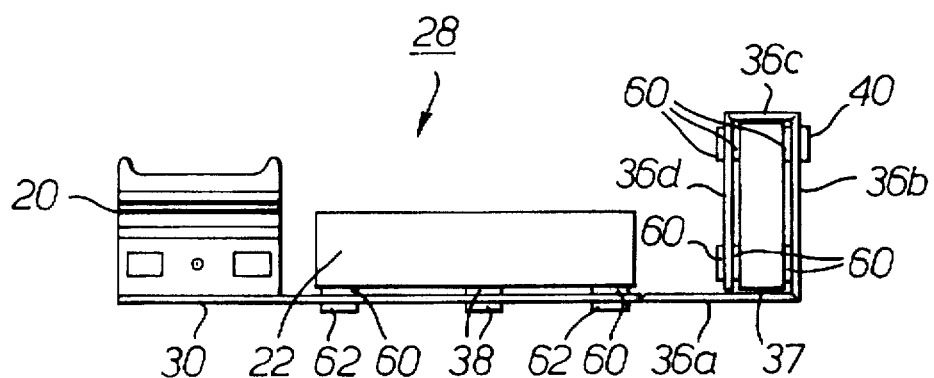
FIG. 2 is a side view of the holder in an intermediate configuration illustrating the mounting of the devices in the holder.

The cradle 20, transceiver housing 22, and battery pack 26 are mounted on the holder 28 in the following manner. The cradle 20 is mounted on the base portion 30 along the edge opposite the rectangular shaped extending portion 32 using a cradle mount 31, and the transceiver housing 22 is mounted adjacent the cradle 20 on the rectangular shaped portion 32 using suitable fastenings (not shown). This is shown in FIG. 2.

The lines of weakness 34a–34d divide the rectangular shaped portion 32 into four areas to define wall portions 36a–36d when the holder 28 is in a folded configuration. The battery pack 26 is placed on the second 36b of these wall portions 36a–36d.

For assembling the devices on the holder 28 as a unit, the rectangular shaped portion 32 is initially folded along lines of weakness 34c and 34d to enclose the battery pack 26 by wall portions 36b–36d. This is illustrated in FIG. 2. The rectangular-shaped portion 28 is then further folded along line of weakness 34a at the junction of the base 30 and rectangular shaped portion 32, and along line of weakness 34b. All these folds are through 900° and the assembled unit with the housing 28 in this folded configuration is such that the battery pack 26 is now enclosed in an open-ended cavity 37 defined by wall portions 36a–36d and is located on top of the transceiver 22. This is shown clearly in FIG. 3. The handset 14 is placed on the cradle 20.

Figure 3:
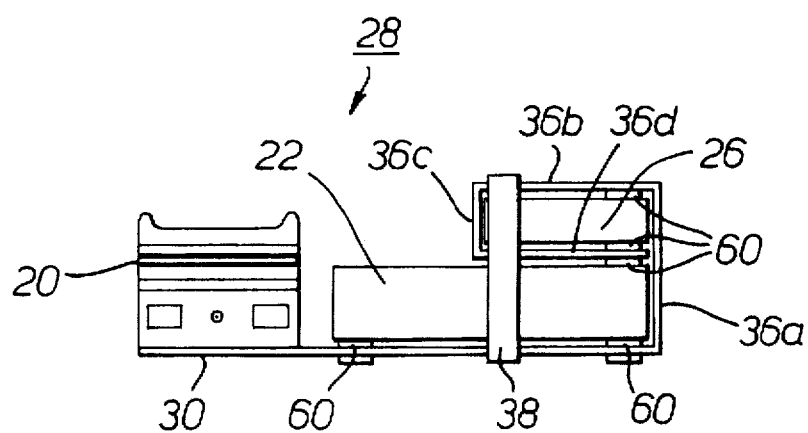
FIG. 3 is a side view of the holder for the telephone, cradle handset, transceiver housing and battery pack in a folded configuration as ready for insertion in the bag.

The base portion 30 is provided with straps 38a, 38b, adjacent the transceiver region extending in a direction perpendicular to the rectangular-shaped portion 32. When the holder 28 is in the folded configuration as shown in FIG. 3, the straps 38a, 38b are brought up the sides of the transceiver 22 and battery pack 26 and over the top of the wall portion 36b to retain the battery pack 26 in place. The holder 28 with the cradle, handset, transceiver housing and battery pack can then be easily placed in the bag 2 by opening the flap 6 and inserting it through the opening defined by the flap 6, as shown in FIG. 1.

When the battery pack 26 needs re-charging the holder 28 can be taken out of the bag 2, the straps 38a–38b undone, the holder 28 unfolded in the reverse manner to that described above and the battery pack 26 removed for recharging.

For fastening, the straps 38a, 38b and the wall portion 36b are provided with "Velcro" fastenings 40 or other suitable fastenings e.g. press studs.

Preferably, straps 38a, 38b comprise a single strap 38 which runs underneath the base portion 30 and through slits 39a, 39b provided in the base portion 30 and the upwards and over the top of the holder 28 to fasten and retain the holder 28 in its folded configuration. A single strap is preferable because it provides a more secure fastening.

Holes 44, 46, 48 are provided in the base portion 30 and wall portions 36a, 36b, so that when the holder 28 is in the folded configuration the holes 44a, 44b, 46,48 are adjacent the transceiver housing 22 and battery pack 26 to assist in heat dissipation. This also reduces the weight of the carrier 28.

Spacers 60 are also provided on these portions, to space the transceiver housing 22 from the base portion 30 and the wall portion 36d, and the battery pack 26 and the from the wall portions 36a–36d. These are preferably made from a rubber material to additionally provide an anti-slip base for the transceiver housing 22 and the battery pack 26.

The base portion 30 may be provided with, for example, a "Velcro" fastening 62 on its lower surface 58 for fastening with a corresponding "Velcro" fastening not shown on the inner side of the underneath surface 10 to maintain the holder 28 in place when in the bag 2.

The bag phone is provided with a detachable antenna 50 which is attached to the transceiver 22 in use. For attachment, the bag 2 is provided with a second zippered opening 52 which allows access to the antenna connection 54 on the transceiver 22. When not in use the antenna 50 is detached, the opening 52 closed, and the antenna 50 stored in the bag 2.

Because the holder 28, in its folded configuration is open ended, there is ample space for the helical cord to be stored adjacent the transceiver housing 28.

The bag 20 may be provided with one or more pockets (not shown) for keeping accessories e.g. a user guide, and the antenna 50.

Typical dimensions for the bag are a length and width of 240 mm and a depth of 75 mm respectively.

The holder 28 may typically be made from cardboard material, which is strong enough to support the devices mounted thereon but is lightweight and cheap, thus reducing manufacturing costs.

From the foregoing description it will be evident to a person skilled in the art that various modifications may be made within the scope of the present invention, for example, other folded configurations can be envisaged which would allow access to the battery pack for its removal.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during the prosecution of this application or of any such further application derived therefrom.

What we claim is:

1. A radio telephone assembly comprising transceiver circuitry, a transceiver housing for enclosing the transceiver circuitry, a battery pack for supplying power to the transceiver circuitry and a holder for the transceiver housing and battery pack wherein the holder is configurable between a folded configuration and an unfolded substantially flat configuration during use such that in the folded configuration there is defined a cavity to enclose the battery pack, and wherein the holder is a structural frame for a bag that the assembly is located into to form a bag phone, wherein the holder comprises a rigid sheet comprising a base portion and a rectangular portion extending therefrom, the base portion being arranged to have the transceiver housing mounted thereon and said rectangular portion includes a multiplicity of lines of weakness such that the rectangular portion may be folded to define the cavity to enclose the battery pack in the folded configuration.

2. An assembly according to claim 1 wherein the holder is provided with spacing means for spacing the transceiver housing from said base portion in the folded configuration.

3. An assembly according to claim 2 wherein the rectangular portion is divided into first, second, third and fourth wall portions by the lines of weakness, said first wall portion being connected to the base portion and in the folded configuration, the first wall portion extends substantially orthogonal to the base portion, the second wall portion extends substantially orthogonal to the first wall portion, the third wall portion extends substantially orthogonal to the second wall portion, and the fourth wall portion extends substantially orthogonal to the third wall portion, the first, second, third and fourth wall portions defining the cavity.

4. An assembly according to claim 3 wherein the holder is provided with spacing means for spacing said battery pack from the wall portions of the cavity in the folded configuration.

5. An assembly according to claim 3 wherein the rigid sheet is provided with apertures in said base portion and said rectangular portion adjacent the transceiver housing and battery pack.

6. An assembly according to claim 1 wherein the transceiver housing is provided with retaining means for retaining said transceiver housing in its folded configuration.

7. An assembly according to claim 6 wherein the retaining means are straps attached to a base portion of the holder and arranged to wrap around the outside of the transceiver housing when in its folded configuration.

8. An assembly according to claim 1 wherein the holder is of cardboard material.

9. An assembly according to claim 1 further comprising a carrier means for receiving the holder in its folded configuration for transporting the assembly.

10. An assembly according to claim 9 wherein the holder is provided with first locating means arranged to cooperate with corresponding second locating means provided in the carrier means for locating said housing in a position within said holder.

11. An assembly according to claim 9 wherein the carrier means is a bag.

12. An assembly according to claim 1 further comprising a handset removably coupled to the transceiver housing.

13. An assembly according to claim 1 further comprising a handset removably coupled to the transceiver housing.

14. An assembly according to claim 13 wherein the handset is supported on a cradle mounted on the base portion.

15. In a bag phone comprising a carry bag, transceiver circuitry enclosed in a transceiver housing, a battery pack, and a handset, the improvement comprising:

a holder for stationarily holding the transceiver housing and battery pack relative to each other in the carry bag, the holder being configurable between a substantially flat unfolded configuration and a folded configuration defining a cavity substantially enclosing the battery pack and further comprising a handset cradle connected to the holder, the handset being removably mounted on the cradle and being accessible, with the carry bag open, when the holder is in its folded configuration.

* * * * *